US012643521B2

(12) United States Patent
Cho

(10) Patent No.: US 12,643,521 B2
(45) Date of Patent: Jun. 2, 2026

(54) BRAKE SYSTEM AND CONTROLLING METHOD THEREOF

(71) Applicant: HL MANDO CORPORATION, Gyeonggi-do (KR)

(72) Inventor: Kyungran Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 70 days.

(21) Appl. No.: 18/907,471

(22) Filed: Oct. 5, 2024

(65) Prior Publication Data

US 2025/0353481 A1 Nov. 20, 2025

(30) Foreign Application Priority Data

May 16, 2024 (KR) ........................ 10-2024-0063580

(51) Int. Cl.
*B60T 13/74* (2006.01)
*B60T 17/22* (2006.01)

(52) U.S. Cl.
CPC ............ *B60T 13/745* (2013.01); *B60T 17/22* (2013.01); *B60T 13/741* (2013.01); *B60T 2270/404* (2013.01); *B60T 2270/413* (2013.01); *B60T 2270/415* (2013.01)

(58) Field of Classification Search
CPC ....... B60T 13/745; B60T 17/221; B60T 17/22
See application file for complete search history.

(56) References Cited

U.S. PATENT DOCUMENTS 11,518,358 B2 12/2022 Frenzel et al.
2019/0344762 A1* 11/2019 Alfter ................. B60W 50/023

2020/0039488 A1* 2/2020 Rebholz-Goldmann ....................
                                                    B60T 13/746
2020/0055506 A1* 2/2020 Michels ................. B60T 13/74
2020/0070788 A1* 3/2020 Michels ................. B60T 7/085
2022/0194339 A1* 6/2022 Tarandek .............. B60T 13/745
2023/0032084 A1* 2/2023 Ha .......................... B60R 16/00
2023/0106917 A1* 4/2023 Kim ......................... H02P 5/68
                                                    318/362
2023/0264667 A1* 8/2023 Jung ....................... B60T 17/22
                                                    318/3
2023/0294650 A1* 9/2023 Brenn ....................... B60T 8/92
                                                    303/3
2023/0339447 A1* 10/2023 Ha ....................... B60T 13/745
2024/0140381 A1* 5/2024 Youn .................... B60T 13/148
2024/0375622 A1* 11/2024 Kang ..................... B60T 8/17
2024/0400018 A1* 12/2024 Seo ........................ B60T 8/92

FOREIGN PATENT DOCUMENTS

KR   10-2013-0133191   12/2013
KR      10-2481911    12/2022

* cited by examiner

*Primary Examiner* — Long T Tran

(74) *Attorney, Agent, or Firm* — WOMBLE BOND DICKINSON (US) LLP

(57) ABSTRACT

A brake system may include: a first motor providing a driving force to a first electronic parking brake; a first drive circuit and a second drive circuit each independently connected to the first motor, and driving the first motor; a first switch circuit connected between the first motor and the first drive circuit; a second switch circuit connected between the first motor and the second drive circuit; a first micro controller unit electrically connected to the first drive circuit; and a second micro controller unit electrically connected to the second drive circuit.

20 Claims, 3 Drawing Sheets

BRAKE SYSTEM AND CONTROLLING METHOD THEREOF

CROSS-REFERENCE TO RELATED APPLICATIONS

This application claims the priority of Korean Patent Application No. 10-2024-0063580 filed on May 16, 2024, in the Korean Intellectual Property Office, the disclosure of which is incorporated herein by reference.

BACKGROUND

Field

The present disclosure relates to a brake system and a controlling method thereof.

Description of the Related Art

A brake system for performing braking is requisitely mounted on a vehicle, and various types of brake systems are proposed for the safety of drivers and passengers.

In recent years, as the demands to implement various braking functions responding closely to the vehicle's operating environment have increased, an electronic parking brake (EPB) system has been widely distributed, which includes a liquid pressure supply unit supplying a liquid pressure required for braking to a wheel cylinder by receiving a driver's braking willingness as an electrical signal from a pedal displacement sensor detecting a displacement of a brake pedal.

Further, in recent years, an integrated dynamic brake (IDB) system has been proposed, which can generate a stable and strong braking force by integrating a master booster and an electronic stability control (ESC).

An IDB system in related art is implemented in a structure in which one micro controller unit (MCU) can drive one drive circuit and one motor.

Further, the IDB system in the related art is implemented in a structure in which two MCUs can drive one drive circuit and one motor.

Since such an IDB system in the related art has many parts constituted by electronic devices, there is always a possibility of a fault.

SUMMARY

An object to be achieved by the present disclosure is to provide a brake system having a new structure capable of implementing an integrated dynamic brake (IDB) system with enhanced stability compared to related art, and a controlling method thereof.

Another object to be achieved by the present disclosure is to provide a brake system having a new structure capable of resolving a problem in that braking control through an electronic parking brake cannot be made due to a single point fault such as a fault of a micro controller unit and/or a power supply circuit, and a controlling method thereof.

According to an aspect of the present disclosure, a brake system may include: a first motor configured to provide a driving force to a first electronic parking brake; a first drive circuit and a second drive circuit each independently connected to the first motor, and configured to drive the first motor; a first switch circuit connected between the first motor and the first drive circuit; a second switch circuit connected between the first motor and the second drive circuit; a first micro controller unit electrically connected to the first drive circuit and configured to control the first drive circuit; and a second micro controller unit electrically connected to the second drive circuit and configured to control the second drive circuit, and in which the first micro controller unit may control the first switch circuit so that the first drive circuit is in an opened state when a short-circuit occurs in at least one switching device included in the first drive circuit, and the second micro controller unit may operate in a state in which the first micro controller unit may not control the first drive circuit.

The first micro controller unit and the second micro controller unit may be communication-connected to each other.

The brake system may further include: a first power supply circuit configured to supply power to the first drive circuit and the first micro controller unit; and a second power supply circuit configured to supply power to the second drive circuit and the second micro controller unit.

The first drive circuit may include a first H-bridge circuit for driving the first motor, and a first driver configured to control the first H-bridge circuit.

The first switch circuit may include one or more switching devices connecting each contact between switching devices connected in series among the switching devices included in the first H-bridge circuit, and the first motor.

The brake system may further include a second motor configured to provide the driving force to a second electronic parking brake, and the first drive circuit may further include a third H-bridge circuit for driving the second motor, and the first driver may control the third H-bridge circuit.

The brake system may further include a third switch circuit connected between the second motor and the third H-bridge circuit.

The second drive circuit may include a second H-bridge circuit for driving the first motor, and a second driver configured to control the second H-bridge circuit.

The second micro controller unit may control the second switch circuit so that the second H-bridge circuit is in the opened state when the short-circuit occurs in any one switching device included in the second H-bridge circuit.

The second switch circuit may include one or more switching devices connecting each contact between switching devices connected in series among the switching devices included in the second H-bridge circuit, and the first motor.

The second drive circuit may further include a fourth H-bridge circuit for driving the second motor, and the second driver may control the fourth H-bridge circuit.

The brake system may further include a fourth switch circuit connected between the second motor and the fourth H-bridge circuit.

The brake system may further include a liquid pressure apparatus electrically connected to each of the first micro controller unit and the second micro controller unit, and configured to generate a liquid pressure for braking a vehicle by the control of the first micro controller unit or the second micro controller unit.

According to another aspect of the present disclosure, a controlling method of a brake system may include: controlling, by a first micro controller unit, a first drive circuit to drive a first motor providing a driving force to a first electronic parking brake; controlling, by the first micro controller unit, a first switch circuit connected between the first motor and the first drive circuit so that the first drive circuit is in an opened state when a short-circuit occurs in at least one switching device included in the first drive circuit; and controlling, by the second micro controller unit, a second drive circuit to drive the first motor in a state in which the first micro controller unit may not control the first drive circuit, and in which each of the first drive circuit and the second drive circuit may be independently electrically connected to the first motor, the first micro controller unit may be electrically connected to the first drive circuit, the second micro controller unit may be electrically connected to the second drive circuit, and the first motor and the second drive circuit may be connected through a second switch circuit.

The second micro controller unit may identify that the first micro controller unit may not control the first drive circuit based on communication with the first micro controller unit.

The brake system may further include a first power supply circuit configured to supply power to the first drive circuit and the first micro controller unit, and a second power supply circuit configured to supply power to the second drive circuit and the second micro controller unit.

The first drive circuit may include a first H-bridge circuit for driving the first motor, and a first driver configured to control the first H-bridge circuit.

The first drive circuit may further include a third H-bridge circuit for driving a second motor providing a driving force to a second electronic parking brake, and the first driver may control the third H-bridge circuit, and the controlling method may further include controlling, by the first micro controller unit, the first driver to drive the second motor.

The second drive circuit may include a second H-bridge circuit for driving the first motor, and a second driver configured to control the second H-bridge circuit.

The second drive circuit may further include a fourth H-bridge circuit for driving the second motor, and the second driver may control the fourth H-bridge circuit.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
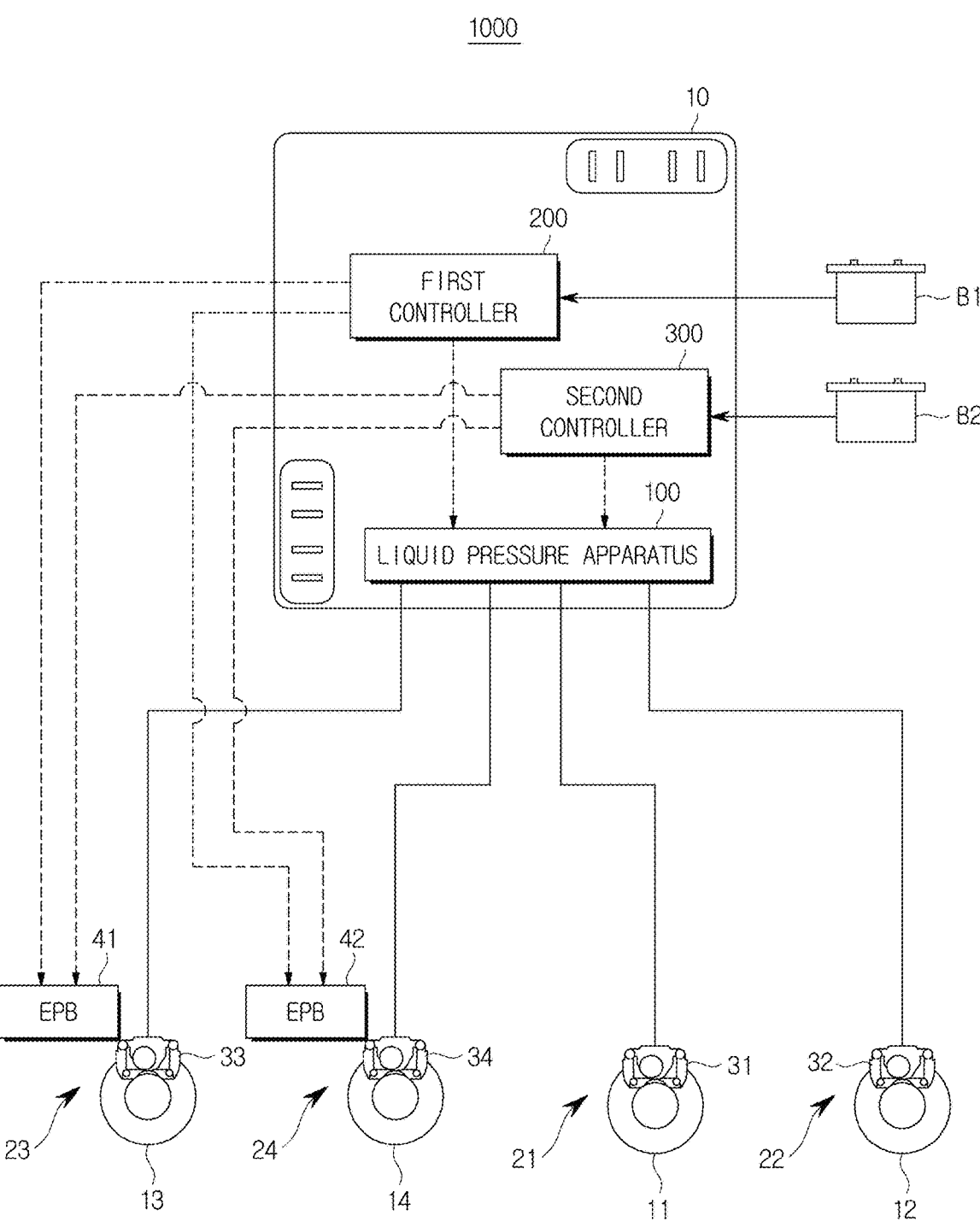
FIG. 1 illustrates a hydraulic and electrical control of a brake system according to an exemplary embodiment.

Like reference numerals refer to like components throughout the specification. This specification does not describe all the components of the embodiments, and duplicative contents between embodiments or general contents in the technical field of the present disclosure will be omitted. The terms 'part,' 'module,' 'member,' and 'block' used in this specification may be embodied as software or hardware, and it is also possible for a plurality of 'parts,' 'modules,' 'members,' and 'blocks' to be embodied as one component, or one 'part,' 'module,' 'member,' and 'block' to include a plurality of components according to embodiments.

Throughout the specification, when a part is referred to as being 'connected' to another part, it includes not only a direct connection but also an indirect connection, and the indirect connection includes connecting through a wireless network.

Also, when it is described that a part 'includes' a component, it means that the part may further include other components, not excluding the other components unless specifically stated otherwise.

Throughout the specification, when a member is described as being 'on' another member, this includes not only a case in which the member is in contact with the other member but also a case in which another member is present between the two members.

The terms first, second, etc. are used to distinguish one component from another component, and the components are not limited by the above-mentioned terms.

The singular forms 'a,' 'an,' and 'the' include plural referents unless the context clearly dictates otherwise.

In each operation, an identification numeral is used for convenience of explanation, the identification numeral does not describe the order of the operations, and each operation may be performed differently from the order specified unless the context clearly states a particular order.

Hereinafter, the exemplary embodiment of the present disclosure will be described with reference to the accompanying drawings and exemplary embodiments as follows. Scales of components illustrated in the accompanying drawings are different from the real scales for the purpose of description, so that the scales are not limited to those illustrated in the drawings.

FIG. 1 illustrates a hydraulic and electrical control of a brake system according to an exemplary embodiment.

Referring to FIG. 1, a brake disk is provided in each of wheels 11, 12, 13, and 14, which is rotated jointly with each of the wheels 11, 12, 13, and 14, and brake calipers 21, 22, 23, and 24 are provided in the wheels 11, 12, 13, and 14, respectively which stop rotation of the wheels 11, 12, 13, and 14. Each of the brake calipers 21, 22, 23, and 24 may include, for example, a pair of brake pads which are provided at both sides of the brake disk, and may press the brake disk.

The brake calipers 21, 22, 23, and 24 include wheel cylinders 31, 32, 33, and 34 which accommodate a liquid pressure, and allow a pair of brake pads to press the brake disk. For example, the wheel cylinders 31, 32, 33, and 34 may include a first wheel cylinder 31 installed in a first brake caliper 21, a second wheel cylinder 32 installed in a second brake caliper 22, a third wheel cylinder 33 installed in a third brake caliper 23, and a fourth wheel cylinder 34 installed in a fourth brake caliper 24.

Electric parking brakes (EPBs) 41 and 42 may be provided in at least some of the brake calipers 21, 22, 23, and 24. For example, the electric parking brakes 41 and 42 may be provided in the third and fourth brake calipers 23 and 24 among the brake calipers 21, 22, 23, and 24. A first EPB 41 may be provided in the third brake caliper 23, and a second EPB 42 may be provided in the fourth brake caliper 24.

A component may be provided in each of the first and second EPBs 41 and 42, which may move the brake pad with an electrical-mechanical force without the liquid pressure. For example, the first and second EPBs 41 and 42 may include motors 410 and 420 in FIG. 2, which have rotary shafts, and spindles which reciprocate by rotation of the rotary shafts, respectively. The spindle may reciprocate the brake pad by the rotation of the rotary shaft.

Each of the first and second EPBs 41 and 42 may press the brake pad toward the brake disk in response to a clamping signal. Further, each of the first and second EPBs 41 and 42 may separate the brake pad from the brake disk in response to a release signal.

The electronic brake system 10 includes a liquid pressure apparatus 100 generating the liquid pressure for braking a vehicle, and a first controller 200 and a second controller 300 controlling an operation of the liquid pressure apparatus 100.

The liquid pressure apparatus 100 may generate a liquid pressure for generating braking forces of the wheels 11, 12, 13, and 14. The liquid pressure apparatus 100 may detect a braking willingness of a driver through a brake pedal 50, for example. The liquid pressure apparatus 100 may generate the liquid pressure based on a movement distance and/or a movement speed of the brake pedal 50, and provide the generated liquid pressure to the wheel cylinders 31, 32, 33, and 34 through transmission paths 61, 62, 63, and 64. The transmission paths 61, 62, 63, and 64 include a first transmission path 61 connected to the first wheel cylinder 31, a second transmission path 62 connected to the second wheel cylinder 32, a third transmission path 63 connected to the third wheel cylinder 33, and a fourth transmission path 64 connected to the fourth wheel cylinder 34.

Internal pressures of the wheel cylinders 31, 32, 33, and 34 may rely on the liquid pressure provided by the liquid pressure apparatus 100. The braking forces may be generated for the wheels 11, 12, 13, and 14 by relying on the internal pressures of the wheel cylinders 31, 32, 33, and 34.

The first controller 200 and the second controller 300 may control the operation of the liquid pressure apparatus 100. For example, the first controller 200 and the second controller 300 may control the liquid pressure apparatus 100 to generate the liquid pressure based on an output of a pedal displacement sensor 51.

The first controller 200 and the second controller 300 may operate to be complementary to each other. For example, the first controller 200 may control the operation of the liquid pressure apparatus 100, and while the first controller 200 may control the operation of the liquid pressure apparatus 100, the second controller 300 may be deactivated. In contrast, when the first controller 200 is in a malfunction state (e.g., power breaking, fault, etc.), the second controller 300 may control the operation of the liquid pressure apparatus 100.

The first controller 200 and the second controller 300 may control the first EPB 41 and the second EPB 42. At least one of the first controller 200 and the second controller 300 may provide the clamping signal to each of the first and second electronic parking brakes 41 and 42 so as to clamp a parking brake in response to a clamping instruction of the driver through a parking button, etc., or may provide the release signal to each of the first and second electronic parking brakes 41 and 42 so as to release the parking brake in response to a release instruction of the driver through the parking button, etc.

For example, the first controller 200 may control the operations of the first and second EPBs 41 and 42, and while the first controller 200 may control the operations of the first and second EPBs 41 and 42, the second controller 300 may be deactivated. In contrast, when the first controller 200 is in the malfunction state (e.g., power breaking, fault, etc.), the second controller 300 may control the operations of the first and second EPBs 41 and 42.

As another example, the second controller 300 may control the operations of the first and second EPBs 41 and 42. In other words, while the first controller 200 controls the operation of the first liquid pressure apparatus 100, the second controller 300 may control the operations of the first and second EPBs 41 and 42, and further, even when the first controller 200 is in the malfunction state, the second controller 300 may control the operations of the first and second EPBs 41 and 42.

As such, the first controller 200 and the second controller 300 may provide redundancy. In order to provide the redundancy, the first controller 200 and the second controller 300 may receive power from different power networks. For example, as illustrated in FIG. 1, the first controller 200 may receive the power from a first battery B1, and the second controller 300 may receive the power from a second battery B2. However, it is not limited that the first controller 200 and the second controller 300 receive the power from different batteries B1 and B2, and the first controller 200 and the second controller 300 may receive the power from the same battery through different power lines.

As described above, the brake system 10 may include the first controller 200 and the second controller 300 that provides the redundancy. As a result, the reliability of the electronic brake system 10 may be enhanced.

Figure 2:
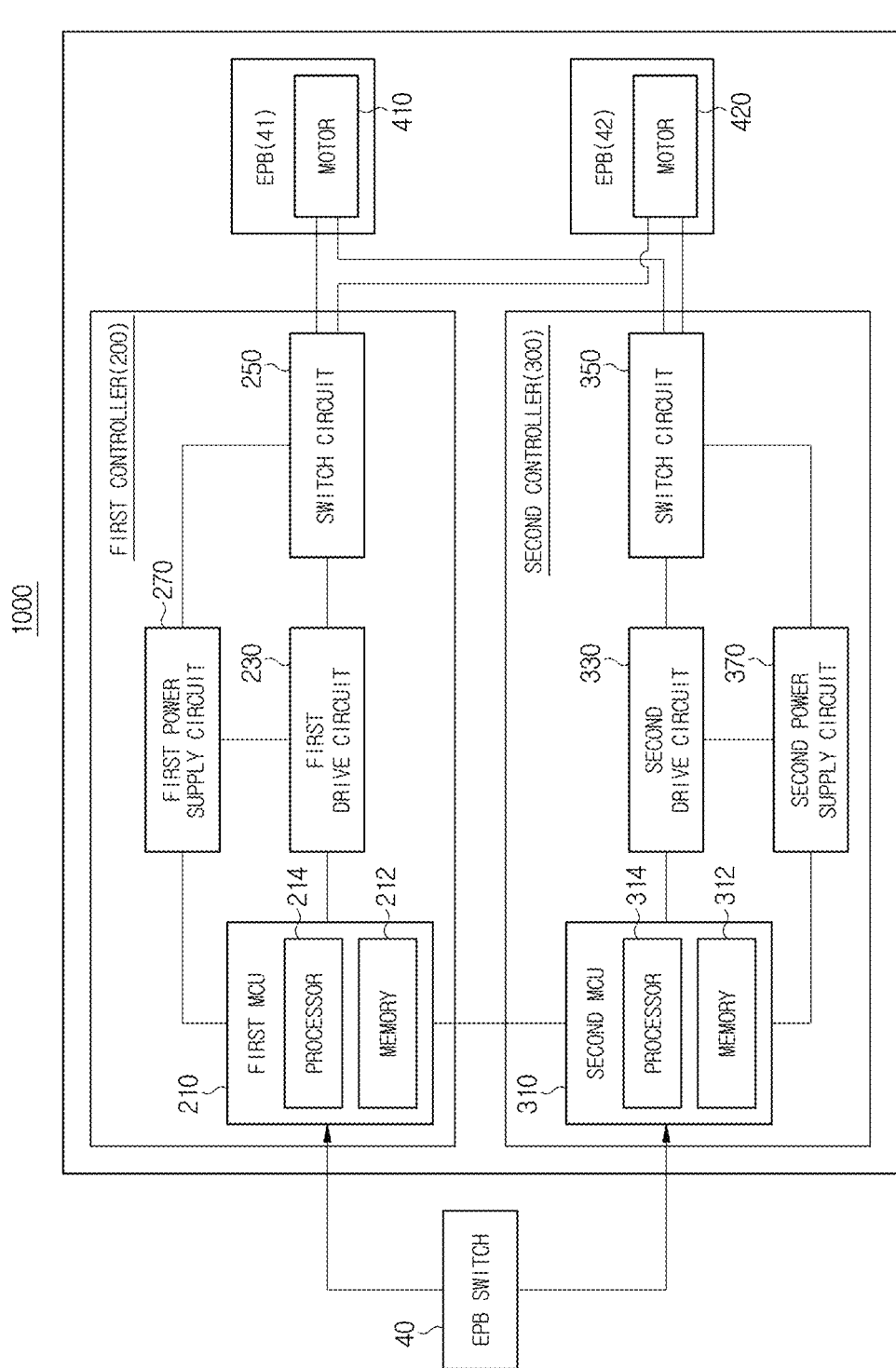
FIG. 2 is a diagram illustrating a partial electrical configuration of a brake system 1000 according to an exemplary embodiment.

FIG. 2 is a diagram illustrating a partial electrical configuration of a brake system 1000 according to an exemplary embodiment.

Referring to FIG. 2, the first controller 200 of the brake system 1000 may control each of the first and second EPBs 41 and 42.

The first controller 200 may include a first micro controller unit (MCU) 210, a first drive circuit 230, a switch circuit 250, and/or a first power supply circuit 270.

The first MCU 210 may be electrically connected to the first drive circuit 230, and may control the first drive circuit 230.

The first MCU 210 may control the first drive circuit 230 based on the clamping instruction (or also referred to as the clamping signal) or the release instruction (or also referred to as the release signal) through an EPB switch 40 electrically connected to the parking button of the vehicle.

The first MCU 210 may control the switch circuit 250 connected between each motor 410 or 420, and the first drive circuit so that the first drive circuit 230 is in an opened state when a short-circuit occurs in at least one switching device included in the first drive circuit 230.

The first MCU 210 may include a memory 212 and a processor 214.

The memory 212 may store or memorize a program and data for implementing an operation of controlling components included in the brake system 1000.

The memory 212 may provide the stored program and data to the processor 214, and may memorize temporary data generated during the operation of the processor 214. For example, the memory 212 may include a volatile memory such as a static random access memory (S-RAM), a dynamic random access memory (D-RAM), etc., and a non-volatile memory such as a read only memory (ROM), an erasable programmable read only memory (EPROM), a flash memory, etc.

The processor 214 may provide a control signal for controlling the operations of the components included in the brake system 1000.

For example, the processor 214 may provide a signal for driving each of the motors 410 and 420 included in the first and second EPBs 41 and 42 to the first drive circuit 230. For example, the first motor 410 may be referred to as a first motor and the second motor 420 may be referred to as a second motor.

The first drive circuit 230 is connected to each of the first motor 410 of the first EPB 41 and the second motor 420 of the second EPB 42 to drive each of the motors 410 and 420.

The first drive circuit 230 may drive each of the motors 410 and 420 based on the control of the first MCU 210.

For example, according to the driving of each of the motors 410 and 420, the brake pads of the EPBs 41 and 42 may head to the brake disk, or the brake pads may be separated from the brake disk.

The switch circuit 250 is connected between the first drive circuit 230, and each of the motors 410 and 420 to serve to maintain the safety of the first controller 200, and prevent the fault.

For example, the switch circuit 250 may allow the first drive circuit 230, and each of the motors 410 and 420 to be connected to each other, and may cut the connection between the first drive circuit 230, and each of the motors 410 and 420 based on the control of the first MCU 210 to be opened.

The first power supply circuit 270 may be electrically connected to the first MCU 210, the first drive circuit 230, and/or the switch circuit 250, and may supply power to the first MCU 210, the first drive circuit 230, and the switch circuit 250.

For example, the first power supply circuit 270 may include the first battery B1 of FIG. 1 or may include a circuit connected to the first battery B1.

The second controller 300 of the brake system 1000 is electrically connected to the first and second EPBs 41 and 42 to control each of the first and second EPBs 41 and 42.

The second controller 300 may include a second MCU 310, a second drive circuit 330, a switch circuit 350, and/or a second power supply circuit 370.

The second MCU 310 may be electrically connected to the second drive circuit 330, and may control the second drive circuit 330.

The second MCU 310 may control the second drive circuit 330 based on the clamping instruction (or also referred to as the clamping signal) or the release instruction (or also referred to as the release signal) through the EPB switch 40.

The second MCU 310 may control the switch circuit 350 connected between each motor 410 or 420, and the second drive circuit so that the second drive circuit 330 is in the opened state when the short-circuit occurs in at least one switching device included in the second drive circuit 330.

The second MCU 310 may include a memory 312 and a processor 314.

The memory 312 may store or memorize a program and data for implementing the operation of controlling the components included in the brake system 1000.

The memory 312 may provide the stored program and data to the processor 314, and may memorize temporary data generated during the operation of the processor 314. For example, the memory 312 may include the volatile memory such as the static random access memory (S-RAM), the dynamic random access memory (D-RAM), etc., and the non-volatile memory such as the read only memory (ROM), the erasable programmable read only memory (EPROM), a flash memory, etc.

The processor 314 may provide the control signal for controlling the operations of the components included in the brake system 1000.

For example, the processor 314 may provide the signal for driving each of the motors 410 and 420 included in the first and second EPBs 41 and 42 to the second drive circuit 330.

The second drive circuit 330 is connected to each of the first motor 410 of the first EPB 41 and the second motor 420 of the second EPB 42 to drive each of the motors 410 and 420.

The second drive circuit 330 may drive each of the motors 410 and 420 based on the control of the second MCU 310.

For example, according to the driving of each of the motors 410 and 420, the brake pads of the EPBs 41 and 42 may head to the brake disk, or the brake pads may be separated from the brake disk.

The switch circuit 350 is connected between the second drive circuit 330, and each of the motors 410 and 420 to serve to maintain the safety of the second controller 300, and prevent the fault.

For example, the switch circuit 350 may allow the second drive circuit 330, and each of the motors 410 and 420 to be connected to each other, and may cut the connection between the second drive circuit 330, and each of the motors 410 and 420 based on the control of the second MCU 310 to be opened.

The second power supply circuit 370 may be electrically connected to the second drive circuit 330, and may supply power to the second MCU 310, the second drive circuit 330, and the switch circuit 350.

For example, the second power supply circuit 370 may include the second battery B2 of FIG. 1 or may include a circuit connected to the second battery B2.

Figure 3:
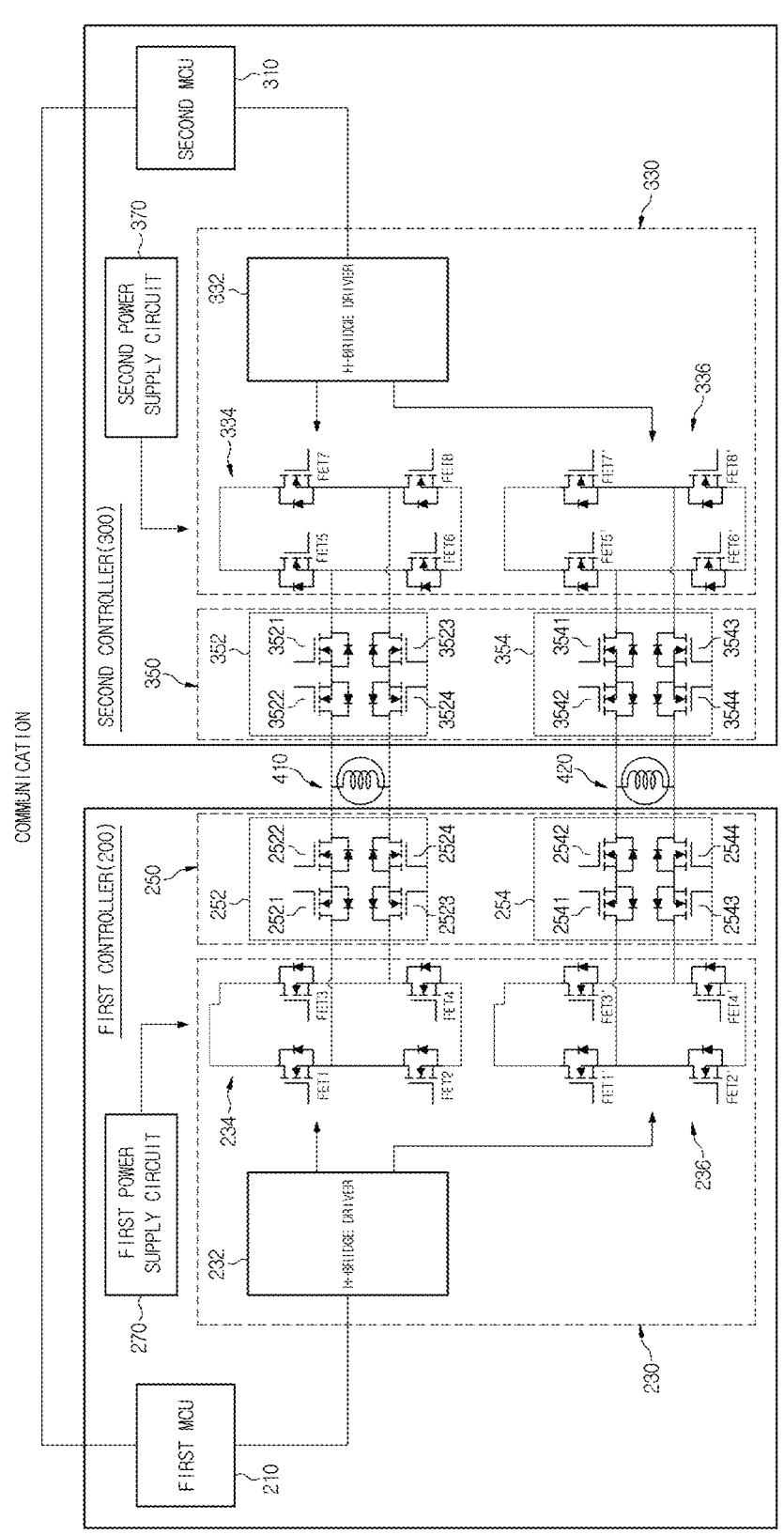
FIG. 3 is a diagram schematically illustrating a partial circuit of the brake system 1000 according to an exemplary embodiment.

FIG. 3 is a diagram schematically illustrating a partial circuit of the brake system 1000 according to an exemplary embodiment.

Referring to FIG. 3, the first controller 200 of the brake system 1000 may include the first MCU 210, an H-bridge driver 232 (or also referred to as a first driver), an H-bridge circuit 234 (or also referred to as a first H-bridge circuit), an H-bridge circuit 236 (or also a third H-bridge circuit), a switch circuit 252 (or also referred to as a first switch circuit), a switch circuit 254 (or also referred to as a third switch circuit), and/or the first power supply circuit 270.

The first MCU 210 may be electrically connected to the H-bridge driver 232, and may transmit a control signal for rotating, e.g., forward rotating or reversely rotating each of the motors 410 and 420 of the EPBs 41 and 42 to the H-bridge driver 232.

The H-bridge driver 232 may be electrically connected to each of the H-bridge circuits 234 and 236, and may control each of the H-bridge circuits 234 and 236 based on the control signal of the first MCU 210.

The H-bridge circuit 234 may be electrically connected to the first motor 410, and may include four switching devices for forward rotating or reversely rotating the first motor 410, e.g., first to fourth switching devices FET1, FET2, FET3, and FET4.

A first switching device FET1 at an upper side and a second switching device FET2 at a lower side of a half-bridge corresponding to one side of the H-bridge circuit 234 may be connected to each other in series. The first switching device FET1 may be connected to the first motor 410, more specifically, a drain terminal of the first switching device FET1 may be connected to a power supply of the first motor 410. A source terminal of the second switching device FET2 may be connected to the ground.

A third switching device FET3 at the upper side and a fourth switching device FET4 at the lower side of the half-bridge corresponding to the other one side of the H-bridge circuit 234 may be connected to each other in series. The third switching device FET3 may be connected to the first motor 410, more specifically, a drain terminal of the third switching device FET3 may be connected to the power supply of the first motor 410. A source terminal of the fourth switching device FET4 may be connected to the ground.

A contact between the first switching device FET1 and the second switching device FET2 may be connected to one side of the first motor 410, and a contact between the third switching device FET3 and the fourth switching device FET4 may be connected to the other side of the first motor 410.

The H-bridge circuit 234 and the first motor 410 may be connected to each other through the switch circuit 252.

As each of the switching devices FET1, FET2, FET3, and FET4 of the H-bridge circuit 234 is controlled to be turned on or off, the power is supplied to the first motor 410, so the first motor 410 may be forward rotated or reversely rotated.

The switch circuit 252 may include one or more switching devices 2521 and 2522 connecting the contact between the first switching device FET1 and the second switching device FET2, and the first motor 410, and one or more switching devices 2523 and 2524 connecting the contact between the third switching device FET3 and the fourth switching device FET4, and the first motor 410.

The H-bridge circuit 236 may be electrically connected to the second motor 420, and may include four switching devices for forward rotating or reversely rotating the second motor 420, e.g., first to fourth switching devices FET1', FET2', FET3', and FET4'.

A first switching device FET1' at the upper side and a second switching device FET2' at the lower side of the half-bridge corresponding to one side of the H-bridge circuit 236 may be connected to each other in series. The first switching device FET1' may be connected to the second motor 420, more specifically, a drain terminal of the first switching device FET1' may be connected to a power supply of the second motor 420. A source terminal of the second switching device FET2' may be connected to the ground.

A third switching device FET3' at the upper side and a fourth switching device FET4' at the lower side of the half-bridge corresponding to the other one side of the H-bridge circuit 236 may be connected to each other in series. The third switching device FET3' may be connected to the second motor 420, more specifically, a drain terminal of the third switching device FET3' may be connected to the power supply of the second motor 420. A source terminal of the fourth switching device FET4' may be connected to the ground.

A contact between the first switching device FET1' and the second switching device FET2' may be connected to one side of the second motor 420, and a contact between the third switching device FET3' and the fourth switching device FET4' may be connected to the other side of the second motor 420.

The H-bridge circuit 236 and the second motor 420 may be connected to each other through the switch circuit 254.

As each of the switching devices FET1', FET2', FET3', and FET4' of the H-bridge circuit 236 is controlled to be turned on or off, the power is supplied to the second motor 420, so the second motor 420 may be forward rotated or reversely rotated.

The switch circuit 254 may include one or more switching devices 2541 and 2542 connecting the contact between the first switching device FET1' and the second switching device FET2', and the second motor 420, and one or more switching devices 2543 and 2544 connecting the contact between the third switching device FET3' and the fourth switching device FET4', and the second motor 420.

The first power supply circuit 270 may be electrically connected to the H-bridge circuits 234 and 236, and may supply the power to each of the components of the first controller 200.

The second controller 300 of the brake system 1000 may include the second MCU 310, an H-bridge driver 332 (or also referred to as a second driver), an H-bridge circuit 334 (or also referred to as a second H-bridge circuit), an H-bridge circuit 336 (or also a fourth H-bridge circuit), a switch circuit 352 (or also referred to as a second switch circuit), a switch circuit 354 (or also referred to as a fourth switch circuit), and/or the first power supply circuit 370.

The second MCU 310 may be electrically connected to the H-bridge driver 332, and may transmit a control signal for rotating, e.g., forward rotating or reversely rotating each of the motors 410 and 420 of the EPBs 41 and 42 to the H-bridge driver 332.

The H-bridge driver 332 may be electrically connected to each of the H-bridge circuits 334 and 336, and may control each of the H-bridge circuits 334 and 336 based on the control signal of the second MCU 310.

The H-bridge circuit 334 may be electrically connected to the first motor 410, and may include four switching devices for forward rotating or reversely rotating the first motor 410, e.g., fifth to eighth switching devices FET5, FET6, FET7, and FET8.

A fifth switching device FET5 at the upper side and a sixth switching device FET6 at the lower side of the half-bridge corresponding to one side of the H-bridge circuit 334 may be connected to each other in series. The fifth switching device FET5 may be connected to the first motor 410, more specifically, a drain terminal of the fifth switching device FET5 may be connected to the power supply of the first motor 410. A source terminal of the sixth switching device FET6 may be connected to the ground.

A seventh switching device FET7 at the upper side and an eighth switching device FET8 at the lower side of the half-bridge corresponding to the other one side of the H-bridge circuit 334 may be connected to each other in series. The seventh switching device FET7 may be connected to the first motor 410, more specifically, a drain terminal of the seventh switching device FET7 may be connected to the power supply of the first motor 410. A source terminal of the eighth switching device FET8 may be connected to the ground.

A contact between the fifth switching device FET5 and the sixth switching device FET6 may be connected to one side of the first motor 410, and a contact between the seventh switching device FET7 and the eighth switching device FET8 may be connected to the other side of the first motor 410.

The H-bridge circuit 334 and the first motor 410 may be connected to each other through the switch circuit 352.

As each of the switching devices FET5, FET6, FET7, and FET8 of the H-bridge circuit 334 is controlled to be turned on or off, the power is supplied to the first motor 410, so the first motor 410 may be forward rotated or reversely rotated.

The switch circuit 352 may include one or more switching devices 3521 and 3522 connecting the contact between the fifth switching device FET5 and the sixth switching device FET6, and the first motor 410, and one or more switching devices 3523 and 3524 connecting the contact between the seventh switching device FET7 and the eighth switching device FET8, and the first motor 410.

The H-bridge circuit 336 may be electrically connected to the second motor 420, and may include four switching devices for forward rotating or reversely rotating the second motor 420, e.g., fifth to eighth switching devices FET5', FET6', FET7', and FET8'.

The fifth switching device FET5' at the upper side and the sixth switching device FET6' at the lower side of the half-bridge corresponding to one side of the H-bridge circuit 336 may be connected to each other in series. The fifth switching device FET5' may be connected to the second motor 420, more specifically, a drain terminal of the fifth switching device FET5' may be connected to the power supply of the second motor 420. A source terminal of the sixth switching device FET6' may be connected to the ground.

The seventh switching device FET7' at the upper side and the eighth switching device FET8' at the lower side of the half-bridge corresponding to the other one side of the H-bridge circuit 336 may be connected to each other in series. The seventh switching device FET7' may be connected to the second motor 420, more specifically, a drain terminal of the seventh switching device FET7' may be connected to the power supply of the second motor 420. A source terminal of the eighth switching device FET8' may be connected to the ground.

A contact between the fifth switching device FET5' and the sixth switching device FET6' may be connected to one side of the second motor 420, and a contact between the seventh switching device FET7' and the eighth switching device FET8' may be connected to the other side of the second motor 420.

The H-bridge circuit 336 and the second motor 420 may be connected to each other through the switch circuit 354.

As each of the switching devices FET5', FET6', FET7', and FET8' of the H-bridge circuit 336 is controlled to be turned on or off, the power is supplied to the second motor 420, so the second motor 420 may be forward rotated or reversely rotated.

The switch circuit 354 may include one or more switching devices 3541 and 3542 connecting the contact between the fifth switching device FET5 and the sixth switching device FET6', and the second motor 420, and one or more switching devices 3543 and 3544 connecting the contact between the seventh switching device FET7' and the eighth switching device FET8', and the second motor 420.

The second power supply circuit 370 may be electrically connected to the H-bridge circuits 334 and 336, and may supply the power to each of the components of the second controller 300.

Meanwhile, although not illustrated in FIG. 3, the first controller 200 and the second controller 300 further include communication circuits, respectively, so the first MCU 210 of the first controller 200 and the second MCU 310 of the second controller 300 may communicate with each other (e.g., CAN communication).

For example, the first MCU 210 and the second MCU 310 may communicate with each other periodically or in real time, and through this, the second MCU 310 may identify whether a state of the first controller 200, e.g., the first MCU 210 is in a normal state or an abnormal state.

For example, the normal state indicates a state in which the first MCU 210 normally operates to control each of the motors 410 and 420, more specifically, a state in which the first MCU 210 may control the first drive circuit 230 for driving each of the motors 410 and 420. Additionally, the normal state may include a state in which a problem occurs in power supplying through the first power supply circuit 270.

The abnormal state indicates a state in which each of the motors 410 and 420 may not be controlled due to the fault of the second MCU 310, more specifically, a state in which the second MCU 310 may not control the second drive circuit 330 for driving each of the motors 410 and 420. Additionally, the abnormal state may include a state in which the problem occurs in power supplying through the second power supply circuit 370.

The second MCU 310 may control the EPBs 41 and 42, i.e., control the driving of the motors 410 and 420 when the state of the first MCU 210 is the abnormal state, i.e., when the first MCU 210 may not perform a control operation. At this time, the first drive circuit 230 and the first power supply circuit 270 of the first controller 200 may be in a deactivated state.

The first MCU 210 may control the EPBs 41 and 42, i.e., control the driving of the motors 410 and 420 when the state of the first MCU 210 is the normal state, i.e., when the first MCU 210 may perform the control operation. At this time, the second drive circuit 330 and the second power supply circuit 370 of the second controller 300 may be in the deactivated state.

The H-bridge driver 232, the H-bridge circuit 234, and/or the H-bridge circuit 236 in the exemplary embodiment of FIG. 3 described above may be referred to as the components of the first drive circuit 230.

Further, the H-bridge driver 332, the H-bridge circuit 334, and/or the H-bridge circuit 336 in the exemplary embodiment of FIG. 3 described above may be referred to as the components of the second drive circuit 330.

In addition, it is illustrated and/or described that the switching devices FET1 to FET8, FET1' to FET8', 2521 to 2524, 2521' to 2524', 3521 to 3524, 3521' to 3524' in the exemplary embodiment of FIG. 3 described above are field effect transistors (FETs), but are not limited thereto, and may also be implemented as a relay switch, etc.

Additionally, according to the exemplary embodiments, the first controller 200 may be a primary controller, and the second controller 300 may serve as a secondary controller, e.g., a redundancy of the first controller 200. As a result, the second MCU 310 of the second controller 300 may operate when the state of the first MCU 210 of the first controller 200 is the abnormal state (or also referred to as the fault), e.g., a state in which the first drive circuit 230 may not be controlled.

Further, according to the exemplary embodiment, since independent power supply circuits 270 and 370 are provided in the first and second controllers 200 and 300, respectively, the safety of the brake system 1000 may be enhanced.

For example, the first power supply circuit 270 is provided in the first controller 200 and the second power supply circuit 370 is provided in the second controller 300, and when there is the problem in the power supplying through the power supply circuit 270 of the first controller 200, the second controller 300 may operate while receiving the power through the power supply circuit 370 of the second controller 300, so that the safety of the brake system 1000 may be enhanced.

Further, according to the exemplary embodiments, independent MCUs 210 and 310 and drive circuits 230 and 330 are provided in the controllers 200 and 300, respectively, and the EPBs 41 and 42 are separately controlled for the drive circuits 230 and 330, respectively, i.e., the first and second motors 410 and 420 are implemented to be driven to enhance the safety of the brake system 1000.

For example, the first MCU 210, and the first drive circuit 230 which may drive the first and second motors 410 and 420 based on the control signal of the first MCU 210 are provided in the first controller 200, the second MCU 310, and the second drive circuit 330 which may drive the first and second motors 410 and 420 based on the control signal of the second MCU 310 are provided in the second controller 300, and when braking of each of the EPBs 41 and 42 may not be controlled, i.e., each of the motors 410 and 420 may not be driven due to the fault of the first MCU 210, each of the motors 410 and 420 may be driven through the second drive circuit 330 according to the control of the second MCU 310.

More specifically, the first motor 410 included in the EPB 41 is electrically connected to the H-bridge circuit 234 (or also referred to as the first H-bridge circuit) and the H-bridge circuit 334 (or also referred to as the second H-bridge circuit) which are independent of each other to be driven based on the control signal of any one of the first MCU 210 and the second MCU 310.

For example, when the state of the first MCU 210 is the normal state, the first MCU 210 may transmit the control signal for controlling the first motor 410 to the H-bridge driver 232 (also referred to as the first driver). The first to fourth switching devices FET1, FET2, FET3, and FET4 of the H-bridge circuit 234 may be turned on and/or off by the H-bridge driver 232 that receives the control signal from the first MCU 210, and based thereon, the first motor 410 may be driven.

Further, when the state of the first MCU 210 is the abnormal state, e.g., the state in which the first drive circuit 230 may not be controlled, the second MCU 310 may transmit the control signal for controlling the first motor 410 to the H-bridge driver 332. The fifth to eighth switching devices FET5, FET6, FET7, and FET8 of the H-bridge circuit 334 may be turned on and/or off by the H-bridge driver 332 (or also referred to as the second driver) that receives the control signal from the second MCU 310, and based thereon, the first motor 410 may be driven.

Further, the second motor 420 is electrically connected to the H-bridge circuit 236 and the H-bridge circuit 336 which are independent of each other to be driven based on the control signal of any one of the first MCU 210 and the second MCU 310.

For example, when the state of the first MCU 210 is the normal state, the first MCU 210 may transmit the control signal for controlling the second motor 420 to the H-bridge driver 232. The first to fourth switching devices FET1', FET2', FET3', and FET4' of the H-bridge circuit 236 may be turned on and/or off by the H-bridge driver 232 that receives the control signal from the first MCU 210, and based thereon, the first motor 420 may be driven.

Further, when the state of the first MCU 210 is the abnormal state, the second MCU 310 may transmit the control signal for controlling the first motor 410 to the H-bridge driver 332. The fifth to eighth switching devices FET5', FET6', FET7', and FET8' of the H-bridge circuit 336 may be turned on and/or off by the H-bridge driver 332 that receives the control signal from the second MCU 310, and based thereon, the second motor 420 may be driven.

Further, according to the exemplary embodiment described above, the H-bridge circuits 234, 236, 334, and 336, and the motors 410 and 420 are connected to each other through the switch circuits 252, 254, 352, and 354 to further enhance the safety of the brake system 1000.

For example, when the switch circuit 252 does not exist between the first motor 410 and the H-bridge circuit 234, in a case where a short-circuit fault occurs in any one switching device FET1, FET2, FET3, or FET4 of the H-bridge circuit 234 between two H-bridge circuits 234 and 334 connected for driving the first motor 410, the H-bridge circuit 334 may not drive the first motor 410.

However, when the switch circuit 252 exists between the first motor 410 and the H-bridge circuit 234, in the case where the short-circuit fault occurs in any one switching device FET1, FET2, FET3, or FET4 of the H-bridge circuit 234 between two H-bridge circuits 234 and 334 connected for driving the first motor 410, the H-bridge circuit 234 is electrically or physically separated from the brake system 1000 by cutting off the connection between the H-bridge circuit 234 and the first motor 410 through the switch circuit 252 to allow the remaining components to normally operate.

For example, when the short-circuit occurs in any one switching device FET1, FET2, FET3, or FET4 of the H-bridge circuit 234, the first MCU 210 activates the switch circuit 252 to electrically or physically separate the H-bridge circuit 234 from the brake system 1000. Further, the second MCU 310 may identify that the first motor 410 may not be driven through the first MCU 210 through communication with the first MCU 210, and control the H-bridge drive circuit 332 so as to drive the first motor 410 through the H-bridge circuit 334.

Additionally, when the short-circuit occurs in any one switching device FET1', FET2', FET3', or FET4', FET5, FET6, FET7, or FET8, or FET5', FET6', FET7', or FET8' of other H-bridge circuit 236, 334, or 336, the corresponding MCU 210 or 310 activates the corresponding switch circuit 254, 352, or 354 to electrically or physically separate the H-bridge circuit including the switching device with the short-circuit from the brake system 1000. Further, an MCU not connected to the H-bridge circuit electrically or physically separated from the brake system 1000 may control the motor connected to be driven through the connected H-bridge circuit.

For example, when the short-circuit occurs in any one switching device FET1', FET2', FET3', or FET4' of the H-bridge circuit 236, the first MCU 210 activates the switch circuit 254 to electrically or physically separate the H-bridge circuit 236 from the brake system 1000. Further, the second MCU 310 may identify that the first motor 410 may not be driven through the first MCU 210 through communication with the first MCU 210, and control the H-bridge drive circuit 332 so as to drive the second motor 420 through the H-bridge circuit 336.

In addition, for example, when the short-circuit occurs in any one switching device FET5, FET6, FET7, or FET8 of the H-bridge circuit 334, the second MCU 310 activates the switch circuit 352 to electrically or physically separate the H-bridge circuit 334 from the brake system 1000. Further, the first MCU 210 may identify that the first motor 410 may not be driven through the second MCU 310 through communication with the second MCU 310.

In addition, for example, when the short-circuit occurs in any one switching device FET5', FET6', FET7', or FET8' of the H-bridge circuit 336, the second MCU 310 activates the switch circuit 354 to electrically or physically separate the H-bridge circuit 336 from the brake system 1000. Further, the first MCU 210 may identify that the first motor 410 may not be driven through the second MCU 310 through communication with the second MCU 310.

The brake system and the controlling method thereof according to the exemplary embodiments may provide a technology capable of resolving a problem in that braking control through an electronic parking brake cannot be made due to a single point fault such as a fault of a micro controller unit and/or a power supply circuit.

Meanwhile, the disclosed embodiments may be implemented in the form of a recording medium that stores instructions executable by a computer. The instructions may be stored in the form of program codes, and when executed by a processor, the instructions may perform operations of the disclosed embodiments by generating a program module. The recording medium may be implemented as a computer-readable recording medium.

The computer-readable recording medium may include all kinds of recording media storing instructions that can be interpreted by a computer. For example, the computer-readable recording medium may be Read Only Memory (ROM), Random Access Memory (RAM), a magnetic tape, a magnetic disc, flash memory, an optical data storage device, etc.

A machine-readable storage medium may be provided in the form of a non-transitory storage medium, wherein the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

So far, the disclosed embodiments have been described with reference to the accompanying drawings. It will be understood by one of ordinary skill in the technical art to which the disclosure belongs that the disclosure can be embodied in different forms from the disclosed embodiments without changing the technical spirit and essential features of the disclosure. Thus, it should be understood that the disclosed embodiments described above are merely for illustrative purposes and not for limitation purposes in all aspects.

What is claimed is:

1. A brake system comprising:
   a first motor operably associated with a first electronic parking brake;
   a first drive circuit and a second drive circuit each connected to the first motor to drive the first motor;
   a first switch circuit connected between the first motor and the first drive circuit;
   a second switch circuit connected between the first motor and the second drive circuit;
   a first micro controller unit connected to the first drive circuit and configured to control the first drive circuit; and
   a second micro controller unit connected to the second drive circuit and configured to control the second drive circuit,
   wherein:
   the first micro controller unit is configured to control the first switch circuit to open the first drive circuit in response to short-circuit in at least one switch included in the first drive circuit, and
   the second micro controller unit is configured to operate in a state in which the first micro controller unit does not control the first drive circuit.

2. The brake system according to claim 1, wherein the first micro controller unit and the second micro controller unit are communicationally connected to each other.

3. The brake system according to claim 1, further comprising:
   a first power supply circuit configured to supply power to the first drive circuit and the first micro controller unit; and
   a second power supply circuit configured to supply power to the second drive circuit and the second micro controller unit.

4. The brake system according to claim 1, wherein the first drive circuit includes a first H-bridge circuit configured to drive the first motor, and a first drive configured to control the first H-bridge circuit.

5. The brake system according to claim 4, wherein the first switch circuit includes one or more switches connected between serially-connected switches, included in the first H-bridge circuit, and the first motor.

6. The brake system according to claim 4, further comprising a second motor associated with a second electronic parking brake,
   wherein the first drive circuit further includes a third H-bridge circuit configured to drive the second motor, and
   the first drive is further configured to control the third H-bridge circuit.

7. The brake system according to claim 6, further comprising a third switch circuit connected between the second motor and the third H-bridge circuit.

8. The brake system according to claim 6, wherein the second drive circuit includes a second H-bridge circuit configured to drive the first motor, and a second drive configured to control the second H-bridge circuit.

9. The brake system according to claim 8, wherein the second micro controller unit is configured to control the second switch circuit to open the second H-bridge circuit in response to short-circuit in any one switch included in the second H-bridge circuit.

10. The brake system according to claim 9, wherein the second switch circuit includes one or more switches connected between serially-connected switches, included in the second H-bridge circuit, and the first motor.

11. The brake system according to claim 8, wherein:
   the second drive circuit further includes a fourth H-bridge circuit configured to drive the second motor, and
   the second drive is configured to control the fourth H-bridge circuit.

12. The brake system according to claim 11, further comprising a fourth switch circuit connected between the second motor and the fourth H-bridge circuit.

13. The brake system according to claim 11, further comprising:
   a hydraulic pressure generator connected to the first micro controller unit and the second micro controller unit, and configured to generate a hydraulic pressure for a brake operation by control of the first micro controller unit or the second micro controller unit.

14. A method of controlling a brake system, comprising:
   controlling, by a first micro controller unit, a first drive circuit to drive a first motor operably associated with a first electronic parking brake;
   controlling, by the first micro controller unit, a first switch circuit, connected between the first motor and the first drive circuit, to open the first drive circuit in response to short-circuit in at least one switch included in the first drive circuit; and

17 controlling, by the second micro controller unit, a second drive circuit to drive the first motor when the first micro controller unit does not control the first drive circuit, wherein:

each of the first drive circuit and the second drive circuit is connected to the first motor, the first micro controller unit is connected to the first drive circuit, the second micro controller unit is connected to the second drive circuit, and a second switch circuit is connected between the first motor and the second drive circuit.

15. The method according to claim 14, further comprising detecting, by the second micro controller unit, whether the first micro controller unit does not control the first drive circuit based on communication with the first micro controller unit.

16. The method according to claim 14, further comprising:

supplying, by a first power supply circuit, power to the first drive circuit and the first micro controller unit, and supplying, by a second power supply circuit, power to the second drive circuit and the second micro controller unit.

17. The method according to claim 14, wherein the first drive circuit includes a first H-bridge circuit configured to drive the first motor, and a first drive configured to control the first H-bridge circuit.

18. The method according to claim 17, wherein:

the first drive circuit further includes a third H-bridge circuit configured to drive a second motor operably associated with a second electronic parking brake, the first drive configured to control the third H-bridge circuit, and the method further comprises controlling, by the first micro controller unit, the first driver to drive the second motor.

19. The method according to claim 18, wherein the second drive circuit includes a second H-bridge circuit configured to drive the first motor, and a second drive configured to control the second H-bridge circuit.

20. The method according to claim 18, wherein:

the second drive circuit further includes a fourth H-bridge circuit configured to drive the second motor, and the second driver is configured to control the fourth H-bridge circuit.

* * * * *